(No Model.)
D. W. BOVEE.
HARVESTER.
No. 420,329. Patented Jan. 28, 1890.
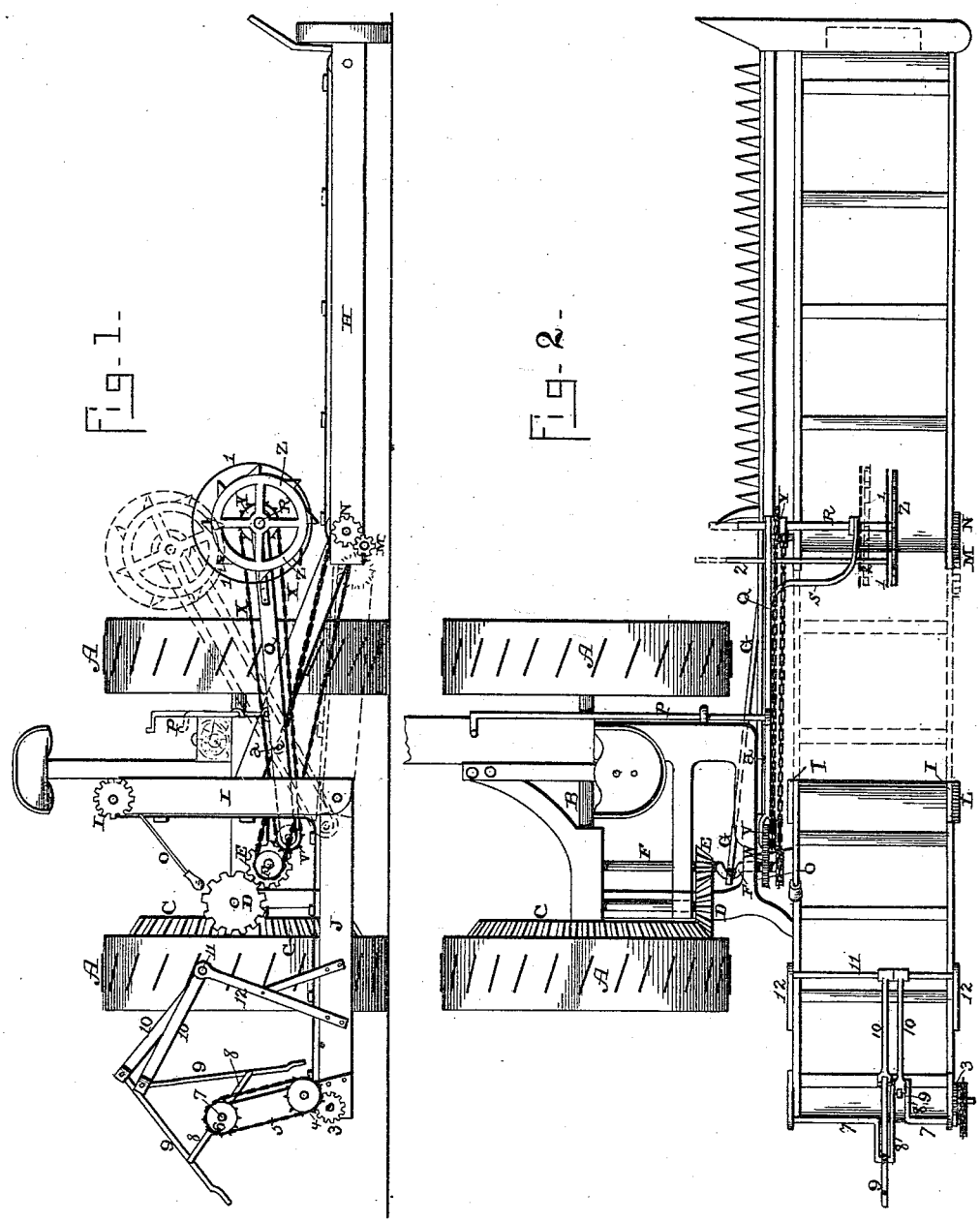
Witnesses.
E. P. Ellis,
J. M. Nesbit.
Inventor:
David W. Bovee,
per F. A. Lehmann,
Atty

UNITED STATES PATENT OFFICE.

DAVID W. BOVEE, OF TAMA, IOWA.

HARVESTER.

SPECIFICATION forming part of Letters Patent No. 420,329, dated January 28, 1890.

Application filed April 24, 1889. Serial No. 308,375. (No model.)

*To all whom it may concern:*

Be it known that I, DAVID W. BOVEE, of Tama, in the county of Tama and State of Iowa, have invented certain new and useful Improvements in Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in harvesters; and it consists in, first, a platform which is made in three sections, the central one of which is pivoted at one end and made vertically adjustable at the other, so that the three sections can be made to form a continuous platform, or the central section can be raised and allow the cut grain to be deposited on the ground at the end of that section of the platform which is in the rear of the cutter; second, the combination, with the driving mechanism of the harvester, of a pivoted lever, a foot-lever for operating it, a sprocket-wheel at each end of the pivoted lever, a sprocket-chain, a stationary disk, and a revolving toothed wheel for moving the heads of the cut grain faster than their butts as they are being moved along by the carrier; third, the combination, with that section of the carrier which is upon the stubble side of the machine, of a double-cranked shaft which is operated by the sprocket-chain which is driven from the roller at the end of the platform, the pivoted levers connected to the cranks and which move the heads of the grain outward, and the supporting-arms and shaft, by means of which the arms are supported, as will be more fully described hereinafter.

The objects of my invention are to construct the platform of the harvester in three sections and make the middle section vertically adjustable at one end, so that when this middle section is raised the cut grain will be dropped from the end of the first section directly upon the ground, and when the pivoted section is lowered into position the grain is carried the full length of the platform and deposited upon the ground upon the stubble side of the harvester, and thus deposit two swaths together in order to save the trouble and time of raking two swaths instead of one, and to place at the ends of the outside sections of the platform a separate mechanism for moving the heads of the cut grain faster than the butts, so as to turn the grain one-quarter around and deposit it upon the ground at a right angle to the direction in which the harvester is moving.

Figure 1 is a rear view of a harvester which embodies my invention. Fig. 2 is a plan view of the same.

A represents the two driving-wheels, which are ratcheted upon the shaft B in the usual manner. Secured to one of the driving-wheels A is a large beveled gear C, which meshes with the beveled idler-pinion D, which in turn gives motion to the pinion E, placed upon the crank-shaft F. To the crank of this shaft is connected the rod G, by which the cutter is operated in the usual manner.

The platform is divided into the sections H I J, of which the two sections H and J are stationary, while the third one I is pivoted at one end and is vertically adjustable at the other. When the section I is lowered into a horizontal position, as shown by dotted lines, the wheel L, secured to one end of the roller which operates the endless belt or carrier which extends around both of the sections I J, meshes with the idler M, which is operated by the wheel N on the end of the roller of the inner end of the section H. When the central section I is raised into the vertical position shown in Fig. 1, the grain is deposited upon the ground at the inner end of the section H; but when the central section I is lowered into position the cut grain is carried the entire length of the three sections H I J and deposited upon the stubble side of the harvester.

Secured to the frame of the central section I is a stationary arm O, which projects upward just in the rear of the driver's seat, by means of which the driver can raise and lower the section at will. This section will be held in a vertical position by any suitable catch which will answer for the purpose.

Journaled upon the top of the frame is a foot-shaft P, which has fastened to its rear end a lever Q, which has passing through its outer end the endwise-moving shaft R, which is journaled both in the lever Q and the brace S, the lever being pivoted upon the rear of the machine at *a*. The lever Q has journaled in its inner end a sprocket and gear wheel V, the gear-wheel of which meshes with the one W upon the cranked shaft F, and the sprocket-wheel of which operates a sprocket-chain X, which in turn gives motion to the sprocket-wheel Y at the outer end of the lever Q, and which sprocket-wheel Y operates the shaft R. Through the sprocket-wheel Y and the end of the lever Q are made openings, and through these openings the shaft R can be adjusted laterally, so as to adjust the wheel Z on its rear end to the height of the grain being cut. The wheel Z is provided with a series of ratchet-teeth, which catch the heads of the cut grain and move them more rapidly than their butts, and thus turn the heads of the grain one-quarter around, so as to deposit the grain upon the ground at a right angle to the line of motion at which the machine is moving. The wheel Z is given a rapid motion, so that as its teeth catch the cut grain the heads are whirled around as it is about to drop from the end of the section H of the platform. In order to prevent the grain from becoming entangled with the teeth of the wheel Z and being carried around, a disk 1 is supported by a rod 2 from the lever Q in close proximity to the inner side of the wheel Z, and this disk is placed eccentrically to the wheel Z, so as to serve as a guard to prevent the grain being carried around by the wheel Z as it revolves. When the shaft R is adjusted laterally, the rod 2 is adjusted at the same time. While the section I is in operation the lever Q is raised at its outer end, so as to throw the wheel V out of gear with the one W; but when the section I is raised the wheel Z is brought into operation, as shown.

At the outer end of the section J of the platform is the wheel 3, on the end of the roller which operates the endless carrier, which is common to both of the sections I J, and this wheel 3 meshes with a gear on the sprocket-wheel 4, around which passes the sprocket-chain 5, which in turn gives motion to the sprocket-wheel 6 on the double-cranked shaft 7. To each of these cranks 8 is attached a lever 9, which is supported by the arms 10, secured to the rod 11, supported in the upper end of the supports 12, which rise from the side of the section J. As the crank-shaft 7 is set in operation as soon as the section I is lowered, as shown in dotted lines, the levers 9 at once begin a reciprocating and rotary motion for the purpose of catching the heads of the cut grain, and throwing them outward faster than the butts are moving for the purpose of turning the grain one-quarter around and depositing it at a right angle to the line of travel at which the machine is moving.

The mechanism shown placed at the inner end of the section H of the platform is only brought into operation when the section I is raised; but when the section I is lowered this mechanism is thrown out of gear by the action of the driver's foot upon the shaft P, but the mechanism located at the outer end of the section J is always brought into gear as soon as the section I is lowered, and hence must be operated directly from the roller at the stubble end of the section J to be automatic in its operation. When the machine cuts its first swath, the section I is raised into a vertical position shown; but in cutting the second swath this section I is lowered so as to bring the third section into operation and thus deliver the second swath upon the ground upon the stubble side of the machine and upon the top of the first swath, thus enabling both swaths to be deposited together and saving one-half the time necessary to rake the grain from the ground.

Having thus described my invention, I claim—

1. In a harvester, a platform composed of three sections, the two outer ones of which are stationary, while the central one is pivoted to one of the end sections at one end and has its other end vertically adjustable so as to leave a space between the inner ends of the two outer sections, substantially as shown.

2. The combination, in a platform, of the three sections H I J, the two outer sections H J being stationary, while the central one I is vertically adjustable at one end with the operating-wheels L M N, the carrier of the two sections which are pivoted together being common to both sections, substantially as described.

3. The combination, with the platform located in the rear of the cutter, of the lever pivoted between its ends, a shaft journaled in the outer end thereof above the platform carrying a sprocket-wheel, a toothed wheel secured to its outer end, a disk or shield eccentrically supported adjacent thereto, the sprocket-wheel journaled in the opposite end of the lever, a sprocket-chain which passes around the wheels, and a gear-wheel at the inner end of the lever for engaging a driving-shaft, whereby the shaft and wheel are revolved, substantially as set forth.

4. The combination, with the operating-shaft, a gear-wheel upon its outer end, the lever pivoted between its ends, a gear-wheel journaled at its inner end engaging said gear upon the operating-shaft and carrying a sprocket-wheel, and a sprocket-wheel journaled in the outer end of the lever, a chain passing around said sprocket-wheels, an endwise-moving shaft at the outer end of the lever sliding in the outer sprocket-wheel, a wheel secured thereto at its outer end overhanging the delivery end of the apron, a disk or shield adjacent to its inner side eccentrically thereto, and a supporting-rod for the disk attached to the lever, substantially as specified.

5. The combination of the three platform-sections, the central section vertically adjustable at its end adjacent to the cutter-platform, the operating-wheel 3, sprocket-wheel 4, having a gear secured thereto, the sprocket-wheel 6, the chain operated by said wheels, the crank-shaft 7, the levers connected to the cranks thereof, the supporting-arms 10 and rod 11, the operating-wheel 3, receiving its motion from the cutter-platform through the medium of the carrier of the central section, whereby it is thrown out of motion when said section is raised, substantially as shown.

6. The combination, in a harvester, of a platform composed of three sections, a stationary one in the rear of the cutter-bar, a central one pivoted so as to be raised at the end adjacent to said stationary section, and a stationary one at the opposite side of the machine from the cutter-bar in the rear thereof, a mechanism located at the inner end of the section, which is at the rear of the cutter-bar, for turning the grain partially around while the central section is raised, and a second mechanism for turning the grain partially around, located at the outer end of the stationary platform, which is at the opposite side from the cutter-bar, and in the rear of the machine, substantially as described.

In testimony whereof I affix my signature in presence of two witnesses.

DAVID W. BOVEE.

Witnesses:
 E. P. ELLIS,
 PHILIP MAURO.